Figure 1:
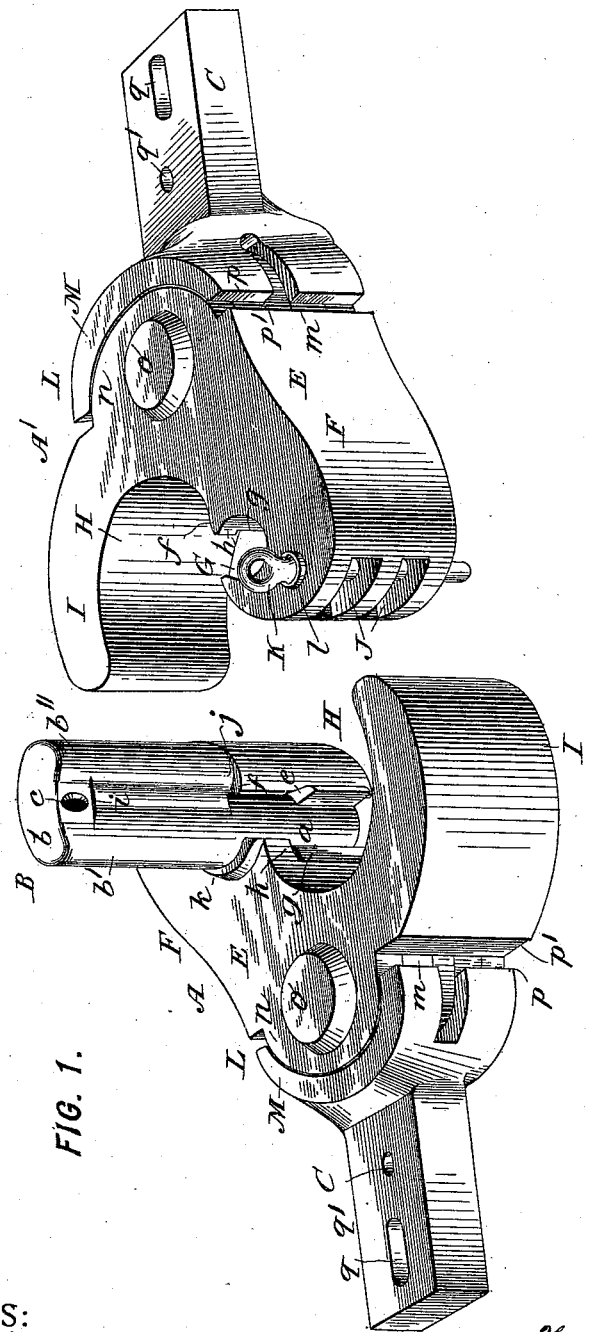

(No Model.)   2 Sheets—Sheet 1.

H. M. WHITTINGTON.
CAR COUPLING.

No. 542,299.   Patented July 9, 1895.

WITNESSES:
John A. Rennie
Fred White

INVENTOR:
Harry M. Whittington,
By his Attorneys,
Arthur E. Fraser & Co.

(No Model.) 2 Sheets—Sheet 2.

H. M. WHITTINGTON.
CAR COUPLING.

No. 542,299. Patented July 9, 1895.

WITNESSES:
John A. Rennie
Fred White

INVENTOR:
Harry M. Whittington,
By his Attorneys,
Arthur C. Fraser & Co

UNITED STATES PATENT OFFICE.

HARRY M. WHITTINGTON, OF NEW YORK, N. Y., ASSIGNOR OF TWO-THIRDS TO THOMAS W. HOGAN, OF SAME PLACE, AND THOMAS GEREHART, OF BROOKLYN, NEW YORK.

CAR-COUPLING.

SPECIFICATION forming part of Letters Patent No. 542,299, dated July 9, 1895.

Application filed June 24, 1892. Serial No. 437,821. (No model.)

*To all whom it may concern:*

Be it known that I, HARRY M. WHITTINGTON, a citizen of the United States, residing in the city, county, and State of New York, have invented certain new and useful Improvements in Car-Couplers, of which the following is a specification.

This invention relates to couplers for cars, engines, tenders, and other vehicles, and it relates most particularly to such couplers of what may be called the "twin" type—that is, those having opposing reciprocal coupling-heads adapted to interengage when they are coupled.

My invention aims to provide certain improvements in car-couplers generally, and particularly to provide an improved car-coupler of the said class which will be automatic in operation, in order that there will be no necessity for the operator to go between the cars during the coupling thereof, which will automatically uncouple in case of derailment, which will be simple and durable in construction, facile of operation, and will be free from danger of impairment in use.

To this end, in carrying out the preferred form of my invention in one of its most complete embodiments, I construct the opposite coupling-heads with corresponding reciprocal projections or coupling-horns, with corresponding recesses to receive said horns, and with corresponding guiding horns or projections for preserving the coupling-horns in position; and I construct said coupling-horns with coinciding coupling notches or holes adapted to be entered by the coupling-pin; and I provide a coupling-head having a shank adapted to rest in one of said holes while the main body of the pin is above the coupling-head preparatory to coupling and having a wing or other provision adapted to be acted on by the approaching coupling-head to cause the pin to fall as the coupling-heads engage, and thereby, by the entry of its body into the opposing holes of the heads, to lock the coupling together; and I preferably provide the ordinary coupling-notches and provide the ordinary coupling-pins arranged at the outer ends of the opposing heads for convenience in coupling with couplers of other systems; and I preferably pivotally connect the coupling-heads to their draw-bars, whereby they can adapt themselves to the direction of strain; and I provide certain other improvements, which will be hereinafter set forth.

Figure 2:
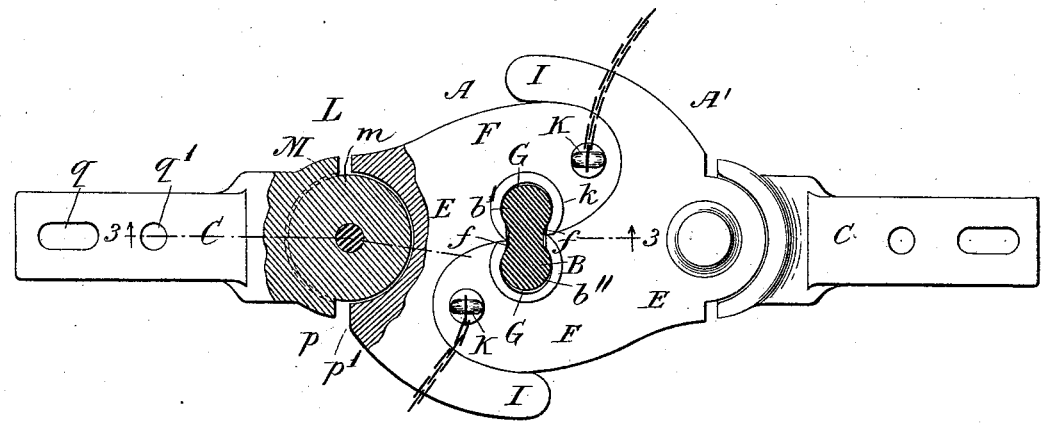
Figure 3:
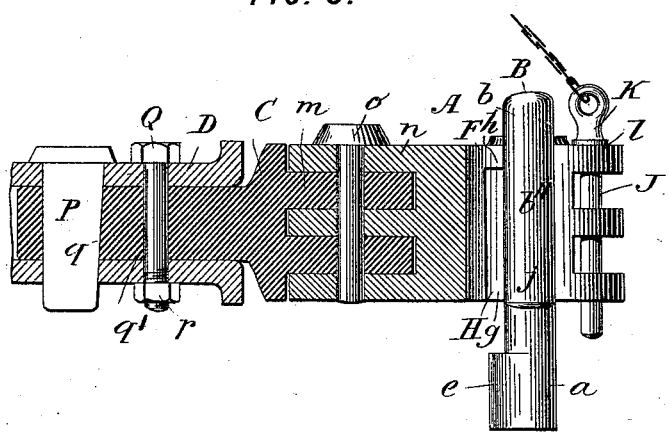
Figure 4:
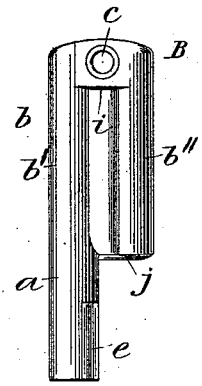

In the accompanying drawings, which illustrate one embodiment and the preferred form of my invention, Figure 1 is a perspective view of two opposite coupling-heads in position ready for coupling. Fig. 2 is a plan view thereof when coupled, the coupling-pin and a portion of one of the heads being in horizontal section. Fig. 3 is a longitudinal section cut on the line 3 3 of one of the coupling-heads, showing the pin in the coupled position; and Fig. 4 is an elevation of the coupling-pin.

Referring to the drawings, with reference to which I will now describe the preferred form of my invention, let A A' indicate the opposing coupling-heads; B, the coupling-pin; C C, the shanks for the respective heads, and D the draw-bar of a car.

The heads are preferably constructed of solid bodies E E, of cast metal or other suitable material, having integral projections or couplings-horns F F, each provided with a coupling-hole G, extending vertically through the horn and preferably arranged at the side thereof in the form of a groove of substantially circular cross-section, which holes are preferably disposed to coincide when the horns F F are in the coupled position, as seen in Fig. 2, whereby the one pin can simultaneously enter both holes. The heads are preferably constructed with reciprocal recesses H H, each adapted to receive the horn F of the opposing coupling-head, and preferably these recesses are flanked by guiding-horns I I, arranged to embrace the outer sides of the coupling-horns F F, opposite to their holes G G, and prevent their lateral escape when the couples are coupled together.

The pin B may be of any suitable construction which will serve to engage the opposite coupling-heads when they are brought into coincidence and lock them together. Preferably it is constructed, as shown, of a substantially-cylindrical shank portion $a$ adapted to fit one of the coupling-holes G, and above this with an enlarged body portion $b$ of greater cross-sectional length than width, the one half $b'$ consisting, preferably, of a continuation of the shank $a$ and the other half $b''$ consisting of a similar piece united to the side of the half $b'$ throughout its length, and which is adapted, when the coupler is in the coupled position, to enter the coupling-hole G of the opposing coupling-horn.

The pin B is constructed with a perforation $c$ at top, by means of which a chain or other provision may be attached for convenience in manipulating and retaining the pin. If a chain is used, this may be connected at its other end to the coupling-head or the car, according to any well-known manner.

According to my invention the pin is maintained with its body $b$ above the top of the horns F F, and upon these coming together is dropped, so that its one half $b'$ falls into the coupling-hole of one horn, and its other half $b''$ into the coupling-hole of the other horn, whereby the separation of the horns is prevented until this portion of the pin is removed. This may be accomplished in various ways; but I prefer to accomplish it in the manner shown, wherein a tail or projection $e$ is formed on the shank $a$ of the pin B and projects angularly relatively to the body portion $b$ thereof in such direction that when the body portion of the pin is turned with its half $b''$ toward the front of the horn carrying it the wing $e$ will project outwardly into the recess H and into the path traveled by the opposing coupling-horn F as the latter moves into coincidence with the horn carrying the pin. By this provision, when the couplers are to be coupled, the pin B will be raised until its body portion is above the horn F, by which it is carried, and will be turned about ninety degrees to bring the half $b''$ of its body portion $b$ toward the front end of this horn, whereupon, as the opposing horn enters the recess H, its face will wipe against the tail $e$ of the pin and thereby rotate the latter to bring the portion $b''$ of its body over the hole G of the entering-horn, whereupon the pin B will fall, the portion $b'$ of its body moving downwardly into the coupling-hole G, previously occupied by its shank $a$, and the portion $b''$ of its body moving downwardly into the coupling-hole G of the opposing coupling-horn, while the intervening uniting portion of the pin between these two halves of its body portion will, in the construction shown, traverse the space between the opposite holes G G. While in this position the shoulders or faces $f\ f$, constituting the forward walls of the coupling-holes G of the opposite coupling-heads, will abut against the opposite sides of the pin B to prevent separation of the coupling-heads until the pin has been removed.

Preferably a groove $g$ is provided at the rear side of each hole G for receiving the tail $e$ of the pin D when the latter turns inwardly under the action of the opposite coupling-horn. Preferably this groove is constructed to permit the free vertical movement of the tail E during the greater part of the height of the coupling-horn, but at top is provided with a shoulder $h$ designed to limit the upward movement of the tail, whereby the escape of the pin from the coupler is ordinarily prevented when the couplings are coupled, since should the pin be jolted or otherwise raised, its upward movement would be stopped by the shoulder $h$ at top of the groove $g$. Preferably the pin at top is constructed with a slight head or shoulder $i$, which rests on the upper faces of the opposite coupling-horns when the pin is in the lowermost position and serves thereby to prevent its further descent, and below this the body portion $b$ of the pin is preferably extended to substantially the thickness of the coupling-horn, so that when in the coupled position the pin serves to interlock the horns throughout their entire height.

When the pin is raised and turned to the open position, any suitable provision may be employed for supporting it. Preferably it is supported by the lower end $j$ of the half $b''$ of its body portion resting either on the top face of the horn F or preferably, as shown, on a shoulder $k$ formed thereon for supporting the pin.

The contour of the coupling-horn F, receiving-recess H, and guiding-horn I of each coupling-head is preferably such that these will make a loose-working fit with the reciprocal corresponding provisions on the opposite horn and permit some flexibility of the coupling when coupled to compensate for the slight twisting due to traversing curves and also to slight inequalities in the construction of the coupling and its connections to the car. Preferably, also, the coupling-holes G G and the coupling-pin B are constructed to give some little play or looseness when in engagement.

According to my invention I construct at the outer end of each coupling-horn one or more recesses J J and provide an ordinary coupling-pin K entering a vertical pin-hole $l$ traversing these recesses, whereby, when the coupler is to be coupled with one of another system, the ordinary link-and-pin coupler may be used.

According to another feature of my invention I provide a swivel connection between the coupling-head A and its draw-bar D. Preferably this consists of the connection L at the rear end of the head, which is here shown as consisting of an ordinary hinge-joint between the coupling-head and the shank C. Preferably the shank C is constructed with a hood or guard M and with perforated projections $m\ m$, and the body E of the coupling-head is constructed with corresponding perforated projections $n\ n$, and a bolt $o$, traversing the perforations in these projections, locks the parts together pivotally. Preferably abutting-shoulders are provided on the opposite parts to limit their swing on this pivotal connection. As here shown, these consist of a face $p$ on the hood M and an opposite face $p'$ on the coupling-head, these being disposed to prevent the swing of the head beyond the limit at which it would automatically be engaged by the opposite coupling-head as the two were brought together. This pivotal connection enables the two heads when coupled to act substantially as a link between their two pivotal connections L L, and it suffices, when the coupling-head is coupled by a link and pin with a coupler of another system, to permit the tilting of the head sufficiently to transmit the drawing strain on a substantially straight line through the head, its draw-bar, and the link of the opposite coupling to which it is connected. It also permits greater freedom for distortion when the couplings are on a curve.

Another feature of my invention is the improved means for attaching the coupling-head to the draw-bar D. This consists in providing the shank C, adapted for separable connection with the draw-bar. This shank may be formed integrally with its coupling-head or be connected thereto, as shown. According to my invention it is constructed with a rearward extension N fitting into the end of the draw-bar D, and preferably constructed with a vertical keyhole $q$ and bolt-hole $q'$, coinciding with similar holes provided at top and bottom of the draw-bar D, and preferably a key P, traversing said keyholes, and a bolt Q, traversing said bolt holes and locked in position by a nut $r$, serve to clamp the shank to the draw-bar in such manner that in case the coupling is impaired it can be quickly removed and another applied without the removal of the draw-bar itself.

In operation, to couple two coupling-heads, the coupling-pin is lifted and turned to the open position, whereupon the cars are run together, and as the opposing head enters into position it rotates and frees the coupling-pin, whereupon the latter falls into the coupling-holes of the respective heads and locks them together. To uncouple, the pin is lifted, whereupon the heads separate. It is then turned to the position ready for the next coupling.

It will be seen that my invention provides a simple car-coupler, requiring in ordinary operation only one pin, which in the working position receives the strain of the coupler throughout substantially the entire depth of the coupling-holes, and is not, therefore, liable to become bent or otherwise distorted in such manner that its removal will be rendered difficult—a coupler which will operate automatically without the necessity for the operator entering between the cars, and one of few parts and simple construction.

It will be understood that my invention can be modified in some respects without departing from its essential features, and that it is not limited to the particular details of construction and arrangement set forth and shown as constituting its preferred adaptation, but that it may be applied in such modified forms as will readily suggest themselves to those skilled in the art or as circumstances may dictate.

What I claim is the following-defined features and combinations, substantially as hereinbefore set forth, namely:

1. In a coupler for cars and other purposes, two coupling heads, having each a coupling horn adapted to engage at one side against the like horn of the other, and having each a recess at its side engaging with the other, said recesses coinciding when said horns engage, and then constituting an oblong pin hole in combination with a pin having a body of oblong cross section, corresponding substantially in shape to the shape of said pinhole entering simultaneously both said recesses and when therein locking said horns together, substantially as and for the purpose set forth.

2. In a coupler for cars and other purposes, the coupling heads having each a coupling horn engaging at one side with the like horn of the other head and having each a coupling hole coinciding with a like hole in the other, in combination with a coupling pin entering both said holes and thereby locking said heads together, said pin carried by one of said heads, when in the unlocked position elevated above said hole therein, and means holding said pin in the unlocked position, substantially as and for the purpose set forth.

3. In a coupler for cars and other purposes, a coupling head having a coupling horn engaging at one side with the like horn of a like coupling head, and having a coupling hole coinciding with a like hole in a like coupling head when the two are in engagement, in combination with a coupling pin carried by said head, entering said hole therein and the like hole in a like head when engaged thereby, said pin when in the unlocked position elevated above said hole, means holding said pin in the unlocked position, and automatically operating means releasing said pin when engaged by a like head, substantially as and for the purpose set forth.

4. In car couplers a coupling head adapted to engage with a like head of a reciprocal coupler, and having a coupling horn F, and a coupling hole G in its side face, a recess H for receiving the horn of a like coupler, and a guiding horn I, in combination with a pin entering said hole G and the like hole of a like coupler for locking the two together, said pin movable above said hole and elevated thereabove when in the unlocked position, means for holding said pin in the unlocked position, and a trip, operated by the engagement of an opposing coupler with said head, and when operated releasing said pin, substantially as and for the purpose set forth.

5. In a coupler for cars and other purposes, two coupling heads, having each a coupling horn, said horns having each at one side an engaging face engaging with the like face of the other horn, and having each a coupling hole in said engaging face coinciding with the like hole of the other, in combination with a coupling pin entering both said holes to lock said heads together, carried by one of said heads, and when in the unlocked position out of engagement with the other of said heads, means for holding said pin in the unlocked position, and a trip carried by the head carrying said pin, projecting at the engaging face of the horn thereof, operated by the like face of the horn of a like head when the two engage, and when operated releasing said pin, substantially as and for the purpose set forth.

6. In a car coupler, the coupling head adapted to engage with a like opposing coupler, having a coupling horn as F, and a coupling hole as G, arranged at its side face, in combination with a coupling pin as B, having a shank as $a$ adapted to fit said hole when the pin is raised and thereby to retain the latter in position, and having an enlarged body portion as $b$, adapted when the pin is in the coupled position to rest a portion thereof in said hole G and the other portion thereof in the corresponding hole of the opposing coupler.

7. In a car coupler, the coupling head adapted to couple with a like opposing coupler and constructed with a coupling horn as F, having a coupling hole as G, traversing its side, in combination with a coupling pin as B, consisting of two portions as $b'\ b''$, the one adapted when the coupler is coupled to fit said coupling hole G and the other adapted to fit a like coupling hole of the opposing coupler.

8. In a car coupler, the coupling head adapted to couple with a like opposing coupler, having a coupling horn F and hole G in the side thereof, and groove $g$ and shoulder $h$ adjacent to said hole, in combination with a coupling pin having a shank entering said hole G and constructed with a wing $e$, adapted when said pin is in one position to project into the path of a similar coupling horn of an opposing coupling head and as the coupling heads approach to be moved thereby into said groove $g$ to permit the coupling pin to lock the couplers together.

In witness whereof I have hereunto signed my name in the presence of two subscribing witnesses.

HARRY M. WHITTINGTON.

Witnesses:
GEORGE H. FRASER,
CHARLES K. FRASER.